United States Patent
Park et al.

(10) Patent No.: US 11,832,105 B2
(45) Date of Patent: Nov. 28, 2023

(54) APPARATUS AND METHOD FOR AUTHENTICATION AND AUTHORIZATION FOR UNMANNED AERIAL SERVICE IN WIRELESS COMMUNICATION SYSTEM

(71) Applicant: Samsung Electronics Co., Ltd., Suwon-si (KR)

(72) Inventors: Jungshin Park, Suwon-si (KR); Yoonseon Han, Suwon-si (KR); Sangjun Moon, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 364 days.

(21) Appl. No.: 17/016,301

(22) Filed: Sep. 9, 2020

(65) Prior Publication Data

US 2021/0076202 A1 Mar. 11, 2021

(30) Foreign Application Priority Data

Sep. 9, 2019 (KR) .................. 10-2019-0111755

(51) Int. Cl.
*H04W 12/55* (2021.01)
*H04W 12/06* (2021.01)
(Continued)

(52) U.S. Cl.
CPC .......... *H04W 12/55* (2021.01); *H04W 12/06* (2013.01); *H04W 12/08* (2013.01); *H04W 12/71* (2021.01);
(Continued)

(58) Field of Classification Search
CPC ..... H04W 12/55; H04W 12/06; H04W 12/08; H04W 12/71; H04W 76/11;
(Continued)

(56) References Cited

U.S. PATENT DOCUMENTS 9,412,278 B1 8/2016 Gong et al.
10,104,708 B2 10/2018 Kim et al.
(Continued)

FOREIGN PATENT DOCUMENTS

WO 2017142362 A1 8/2017
WO 2018008983 A1 1/2018

OTHER PUBLICATIONS

International Search Report and Written Opinion of the International Searching Authority in connection with International Application No. PCT/KR2020/012175 dated Dec. 15, 2020, 7 pages.
(Continued)

*Primary Examiner* — Fred A Casca

(57) ABSTRACT

The present disclosure relates to a pre-5th-Generation (5G) or 5G communication system to be provided for supporting higher data rates Beyond 4th-Generation (4G) communication system such as Long Term Evolution (LTE). The disclosure relates to a method and an apparatus for authenticating an unmanned aerial service (UAS) terminal using a mobile communication system and authorizing a UAS in consideration of information about pairing between UAS terminals. According to a provided method, a UAS operator can authenticate a UAS terminal using a mobile communication system without any additional process and can control a UAS to be provided between an unmanned aerial vehicle (UAV) and a UAV controller (UAC) which are allowed by the operator.

15 Claims, 10 Drawing Sheets

(51) Int. Cl.
*H04W 76/11* (2018.01)
*H04W 12/71* (2021.01)
*H04W 12/08* (2021.01)
H04W 28/02 (2009.01)

(52) U.S. Cl.
CPC ........ *H04W 76/11* (2018.02); *H04W 28/0268* (2013.01)

(58) Field of Classification Search
CPC ..... H04W 28/0268; H04W 8/12; H04W 8/06; H04W 76/12; H04W 12/069; H04W 12/084; H04W 12/69; H04W 12/72; H04W 8/24; H04W 60/00; H04W 84/06
See application file for complete search history.

(56) References Cited

U.S. PATENT DOCUMENTS

| | | |
|---|---|---|
| 10,229,605 B2 | 3/2019 | High et al. |
| 10,269,255 B2 | 4/2019 | High et al. |
| 2016/0275801 A1 | 9/2016 | Kopardekar |
| 2016/0285864 A1 | 9/2016 | Canavor et al. |
| 2018/0090013 A1 | 3/2018 | Park et al. |
| 2019/0019184 A1* | 1/2019 | Lacey .................... G06Q 20/42 |
| 2021/0329460 A1* | 10/2021 | Liao ..................... H04L 63/0892 |
| 2021/0385744 A1* | 12/2021 | Wu ........................ H04W 48/18 |
| 2022/0279355 A1* | 9/2022 | Roy ................... H04W 12/068 |

OTHER PUBLICATIONS

Huawei et al., "Stateless IPv6 Address Autoconfiguration for Control Plane CIoT 5GS Optimisation", Change Request, 3GPP TSG-WG SA2 Meeting #134, Jun. 24-28, 2019, S2-1907712, 18 pages.
"3rd Generation Partnership Project; Technical Specification Group Services and System Aspects; Study on supporting Unmanned Aerial Systems (UAS) connectivity, Identification and tracking (Release 17)", 3GPP TR 23.754 V0.3.0 (Sep. 2020), 124 pages.
"3rd Generation Partnership Project; Technical Specification Group Services and System Aspects; Procedures for the 5G System; Stage 2 (Release 15)", 3GPP TS 23.502 V15.7.0 (Sep. 2019), 357 pages.
Supplementary European Search Report dated Sep. 22, 2022 in connection with European Patent Application No. 20 86 2530, 16 pages.

* cited by examiner

APPARATUS AND METHOD FOR AUTHENTICATION AND AUTHORIZATION FOR UNMANNED AERIAL SERVICE IN WIRELESS COMMUNICATION SYSTEM

CROSS-REFERENCE TO RELATED APPLICATION

This application is based on and claims priority under 35 U.S.C. § 119 to Korean Patent Application No. 10-2019-0111755 filed on Sep. 9, 2019 in the Korean Intellectual Property Office, the disclosure of which is herein incorporated by reference in its entirety.

BACKGROUND

1. Field

The disclosure generally relates to a wireless communication system. More particularly, the disclosure relate to an apparatus and a method for authentication and authorization for an unmanned aerial service (UAS) using a wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

With the development of wireless communication systems, such as a 5G system, it is expected to be able to provide various services. Therefore, there is a need for methods for smoothly providing these services.

The above information is presented as background information only to assist with an understanding of the disclosure. No determination has been made, and no assertion is made, as to whether any of the above might be applicable as prior art with regard to the disclosure.

SUMMARY

The embodiments herein is to provide a method and an apparatus for authenticating a terminal and for authorizing a service in order to provide an unmanned aerial service (UAS) in a wireless communication system.

According to various embodiments, an operating method of an apparatus for an access management function (AMF) in a wireless communication system may include: receiving a registration request message associated with an unmanned aerial service (UAS) of a terminal from the terminal; performing an authentication process of the terminal; requesting registration of the terminal from a user data management (UDM); receiving a response to a request for the registration of the terminal from the UDM; determining whether to perform additional authentication; requesting UAS authentication of the terminal from a UAS traffic management (UTM); receiving a result of the UAS authentication of the terminal from the UTM; and transmitting a registration acceptance message to the terminal.

According to various embodiments, an operating method of an apparatus for a UTM in a wireless communication system may include: receiving a request for authentication associated with a UAS from an AMF; identifying a pair of paired terminals; identifying whether pairing tokens match; performing a UAS authentication process; and transmitting a result of UAS authentication of a terminal to the AMF.

According to various embodiments, an operating method of a terminal in a wireless communication system may include: performing mutual authentication with a different terminal by a predetermined pairing method; requesting registration associated with a UAS from an AMF; and receiving a result of requesting the registration from the AMF.

According to various embodiments, an apparatus for an AMF in a wireless communication system may include: a transceiver; and at least one processor, wherein the at least one processor may be configured to: receive a registration request message associated with a UAS of a terminal from the terminal; perform an authentication process of the terminal; request registration of the terminal from a UDM; receive a response to a request for the registration of the terminal from the UDM; determine whether to perform additional authentication; request UAS authentication of the terminal from a UTM; receive a result of the UAS authentication of the terminal from the UTM; and transmit a registration acceptance message to the terminal.

According to various embodiments, an apparatus for a UTM in a wireless communication system may include: a transceiver; and at least one processor, wherein the at least one processor may be configured to: receive a request for authentication associated with a UAS from an AMF; identify a pair of paired terminals; identify whether pairing tokens match; perform a UAS authentication process; and transmit a result of UAS authentication of a terminal to the AMF.

According to various embodiments, a terminal in a wireless communication system may include: a transceiver; and at least one processor, wherein the at least one processor may be configured to: perform mutual authentication by generating a pairing token and exchanging the pairing token with a different terminal; request registration associated with a UAS from an AMF; and receive a result of requesting the registration from the AMF.

An apparatus and a method according to various embodiments enable an unmanned aerial service (UAS) operator to use a mobile communication system when authorizing a UAS for a UAS terminal, thereby controlling the UAS to be provided between UAS terminals allowed for pairing.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
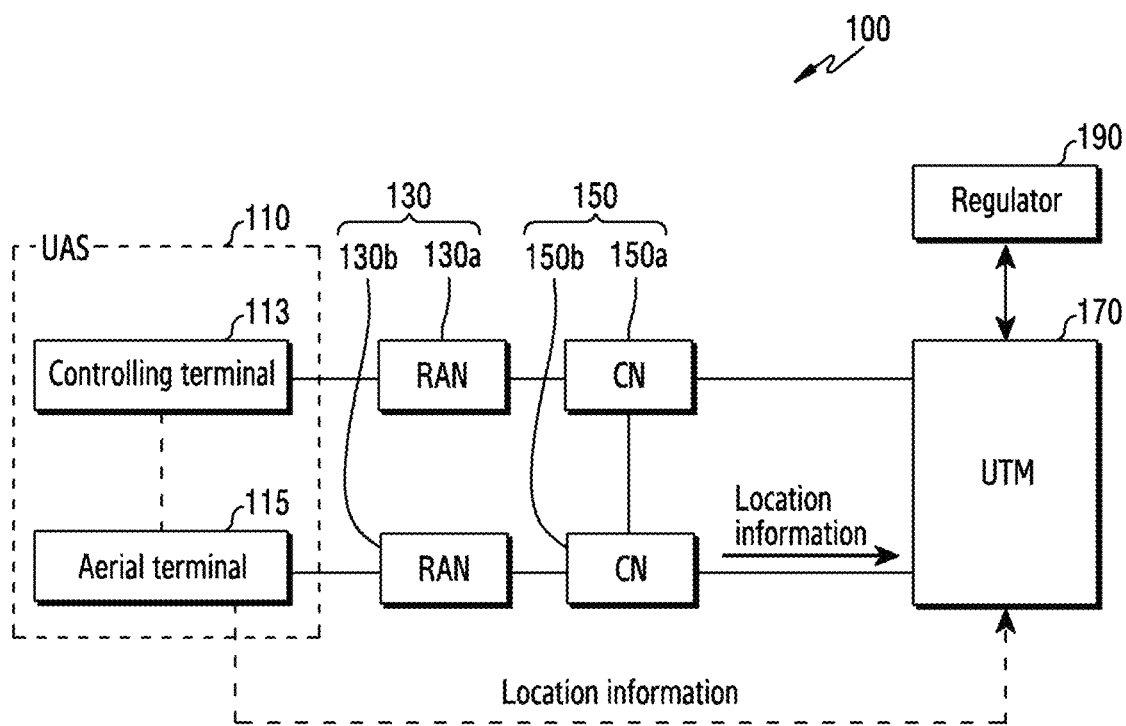
FIG. 1 illustrates an unmanned aerial service (UAS) system according to various embodiments.

It may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meanings as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the terms defined in the disclosure should not be interpreted to exclude embodiments of the disclosure.

In various embodiments of the disclosure to be described below, hardware approaches will be illustrated by way of example. However, various embodiments of the disclosure encompass techniques using both hardware and software and thus are not to be construed as excluding a software-based approach.

The disclosure relates to a method and an apparatus for authentication for an unmanned aerial service (UAS) in a wireless communication system. Specifically, the disclosure illustrates a technique for authenticating a terminal and for authorizing a service in order to provide a UAS in a wireless communication system.

As used herein, terms for identifying access nodes, terms referring to network entities, terms referring to messages, terms referring to interfaces between network entities, terms referring to various types of identification information, and the like are used for convenience of explanation. Therefore, the disclosure is not limited by the following terms, and other terms having equivalent technical meanings may be used.

In the following description, a physical channel and signal may be interchangeable with a data or control signal. For example, although a physical downlink shared channel (PDSCH) is a term referring to a physical channel in which data is transmitted, a PDSCH may also be used to refer to data. That is, in the disclosure, the expression "a physical channel is transmitted" may be interpreted equally as the expression "data or a signal is transmitted through a physical channel".

In the disclosure, higher-layer signaling refers to a method of signal transmission from a base station to a terminal using a downlink data channel of a physical layer or from a terminal to a base station using an uplink data channel of a physical layer. Higher-layer signaling may be understood as radio resource control (RRC) signaling or a media access control (MAC) control element (CE).

Further, although the disclosure illustrates various embodiments using terms used in some communication standards (e.g., 3rd Generation Partnership Project (3GPP)), these standards are provided merely for convenience of description. Various embodiments of the disclosure may be easily modified and applied to other communication systems.

FIG. 1 illustrates a UAS system 100 according to various embodiments.

Referring to FIG. 1, the UAS system 100 includes a controlling terminal 113, an aerial terminal 115, a radio access network (RAN) 130, a core network (CN) 150, a UAS traffic management (UTM) 170, and a regulator 190.

The controlling terminal 113 and the aerial terminal 115 are terminals for a UAS 110. The controlling terminal 113 may access a CN 150a through an RAN 130a, and the aerial terminal 115 may access a CN 150b through an RAN 130b. The aerial terminal 115 is a device capable of unmanned flight by remote control. The controlling terminal 113 is a device to control the aerial terminal 115, and may transmit an instruction to control the aerial terminal 115 according to a user's manipulation. The aerial terminal 115 may be referred to as an unmanned aerial vehicle (UAV), a drone, an aerial user equipment (UE), or other terms with equivalent technical meanings. The controlling terminal 113 may be referred to as a UAV controller (UAC), a remote control device, a controlling UE, or other terms with equivalent technical meanings. In addition, the controlling terminal 113 and the aerial terminal 115 may be collectively referred to as a UAS terminal.

The RAN 130 is a network that is directly connected to a user device (e.g., the controlling terminal 113, the aerial terminal 115, and the like) and is infrastructure providing wireless access for the controlling terminal 113 and the aerial terminal 115. The RAN 130 includes a set of a plurality of base stations, and the plurality of base stations may perform communication through interfaces established therebetween. At least some of the interfaces between the plurality of base stations may be wired or wireless. The base stations may have a structure in which a central unit (CU) and a distributed unit (DU) are separated. In this case, one CU may control a plurality of DUs. Here, the base stations may be referred to as an access point (AP), an eNodeB (eNB), a 5th-generation (5G) node, a next-generation nodeB (gNB), a wireless point, a transmission/reception point (TRP), or other terms with equivalent technical meanings, in addition to a base station.

The CN 150 is a network that manages a system, controls the RAN 130, and processes data and control signals for the terminals 113 and 115 transmitted and received through the RAN 130. The CN 150 performs various functions, such as control of a user plane and a control plane, mobility processing, subscriber information management, billing, and interworking with other types of systems (e.g., a long-term evolution (LTE) system). To perform these various functions, the CN 150 may include a plurality of functionally separated entities having different network functions (NFs). For example, the CN 150 may include at least one of a session management function (SMF), an access management function (AMF), a policy control function (PCF), and a user data management (UDM). The listed functional entities may be configured as at least one hardware device (e.g., a server). When functions of a plurality of functional entities are performed in one device, the plurality of functional entities may be configured as a plurality of virtual machines.

The UTM 170 provides additional information for the UAS 110 and performs a function for controlling an operation. The UTM 170 periodically collects information about a location change of a UAS terminal from the UAS terminal and a mobile communication network in order to track and manage registration and movement of the UAS terminal, that is, each of the aerial terminal 115 and the controlling terminal 113, and performs an operation necessary to control the aerial terminal 115, such as stopping flight of the terminal or controlling the terminal to fly back to a flight-allowed zone when the terminal deviates from the flight-allowed zone, considering flight control information designated by the regulator 190. Further, the UTM 170 receives information for authentication of the UAS terminal and service authorization from the UAS terminal and the mobile communication system and determines whether to authorize a UAS.

The regulator 190 provides the flight control information to the UTM 170. The regulator 190 may be a server including a storage device that stores flight control information. The flight control information is defined by a network operator or a third party (e.g., a government) and may be input to the regulator 190.

Figure 2:
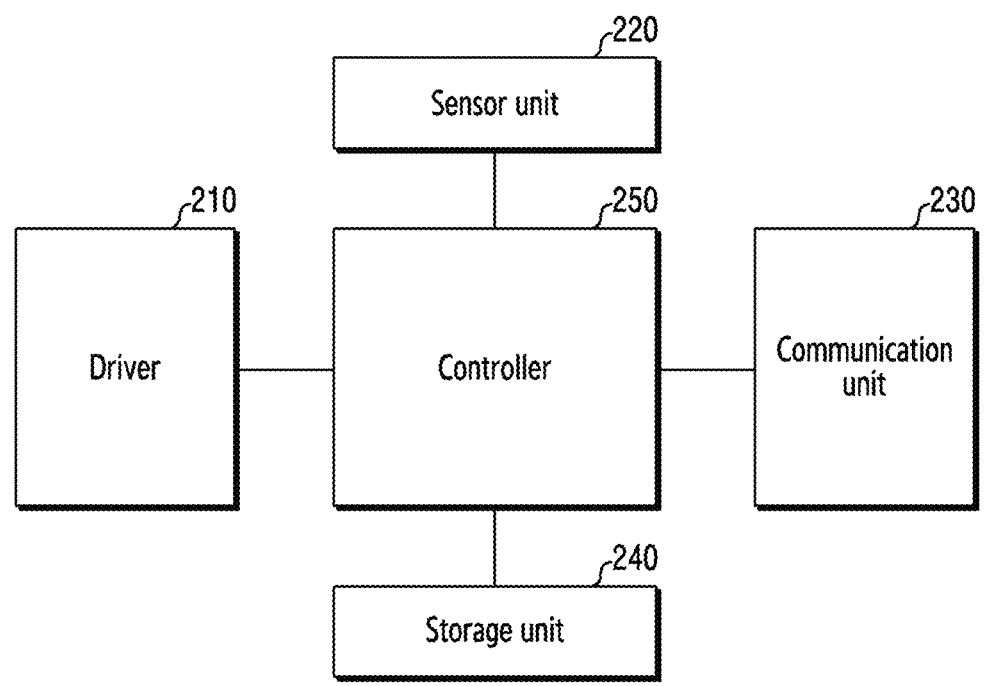
FIG. 2 illustrates the configuration of an aerial terminal according to various embodiments.

FIG. 2 illustrates the configuration of an aerial terminal according to various embodiments. The configuration illustrated in FIG. 2 may be understood as the configuration of the aerial terminal 115. The terms 'unit', '-or/er', and the like used herein indicate a unit for processing at least one function or operation, which may be implemented as hardware, software, or a combination thereof.

Referring to FIG. 2, the aerial terminal includes a driver 210, a sensor unit 220, a communication unit 230, a storage unit 240, and a controller 250.

The driver 210 generates physical power to fly the aerial terminal in the air and to move the aerial terminal in the air. To this end, the driver 210 may include at least one motor, at least one propeller, and the like.

The sensor unit 220 collects sensing data necessary for position control and driving of the aerial terminal. The sensor unit 220 may collect data in order to determine the direction, slope, altitude, and location of the aerial terminal and the distance of the aerial terminal from a different object (e.g., a wall or the ground). To this end, the sensor unit 220 may include at least one of a magnetic force sensor, an acceleration sensor, a gyroscope, a barometric pressure sensor, a global positioning system (GPS) sensor, a distance sensor, an inertial measurement unit (IMU), and a vision sensor.

The communication unit 230 performs functions for transmitting or receiving a signal through a wireless channel. For example, the communication unit 230 performs a function of conversion between a baseband signal and a bit stream according to the physical-layer specification of a system. For example, in data transmission, the communication unit 230 encodes and modulates a transmitted bit stream to generate complex symbols. Further, in data reception, the communication unit 230 demodulates and decodes a baseband signal to reconstruct a received bit stream. The communication unit 230 upconverts a baseb and signal into a radio-frequency (RF) band signal, and may transmit the RF band signal through an antenna. The communication unit 230 downconverts an RF band signal, received through the antenna, into a baseband signal. In one example, the communication unit 230 may include a transmission filter, a reception filter, an amplifier, a mixer, an oscillator, a DAC, an ADC, or the like.

The communication unit 230 may include a plurality of transmission/reception paths. In addition, the communication unit 230 may include at least one antenna array including a plurality of antenna elements. From the aspect of hardware, the communication unit 230 may include a digital circuit and an analog circuit (e.g., a radio-frequency integrated circuit (RFIC)). Here, the digital circuit and the analog circuit may be configured as a single package. Further, the communication unit 230 may include a plurality of RF chains. The communication unit 230 may perform beamforming.

The communication unit 230 may include different communication modules to process signals in different frequency bands. Furthermore, the communication unit 230 may include a plurality of communication modules to support a plurality of different radio access technologies. For example, the different radio access technologies may include Bluetooth Low Energy (BLE), Wireless Fidelity (Wi-Fi), Wi-Fi Gigabyte (WiGig), a cellular network (e.g. long-term evolution (LTE)), and the like. The different frequency bands may include a super-high-frequency (SHF) band (e.g., 2.5 GHz or 5 GHz) and a millimeter (mm)-wave band (e.g., 60 GHz).

As described above, the communication unit 230 transmits and receives a signal. Accordingly, part or all of the communication unit 230 may be referred to as a transmitter, a receiver, or a transceiver. In the following description, transmission and reception performed through a wireless channel are construed as including processing performed as described above by the communication unit 230.

The storage unit 240 stores data, such as a default program, an application, and setting information, for the operation of the aerial terminal. The storage unit 240 may be configured as volatile memory, nonvolatile memory, or a combination of volatile memory and nonvolatile memory. The storage unit 240 provides the stored data in response to a request from the controller 250.

The controller 250 controls the overall operation of the aerial terminal. For example, the controller 250 controls the driver 210, thereby controlling the flight of the aerial terminal. Here, the controller 250 may use the sensing data provided from the sensor unit 220. Further, the controller 250 transmits and receives a signal through the communication unit 230. Here, the controller 250 may receive a control command message transmitted from a controlling terminal (e.g., the controlling terminal 113) through the communication unit 230. In addition, the controller 250 records and reads data in the storage unit 240. The controller 250 may perform functions of a protocol stack required by communication standards. To this end, the controller 250 may include at least one process or microprocessor, or may be part of a processor. Part of the communication unit 230 and the controller 250 may be referred to as a communication processor (CP). According to various embodiments, the controller 250 may control the aerial terminal to perform operations according to various embodiments described below.

Although not shown in FIG. 2, the aerial terminal may further include a camera, a display, and the like in addition to the aforementioned components. When a camera is included, the controller 250 may transmit an image captured by the camera to the controlling terminal through the communication unit 230. When a display is included, the controller 250 may display information about the status of the aerial terminal on the display or may display a screen for configuring the aerial terminal.

Figure 3:
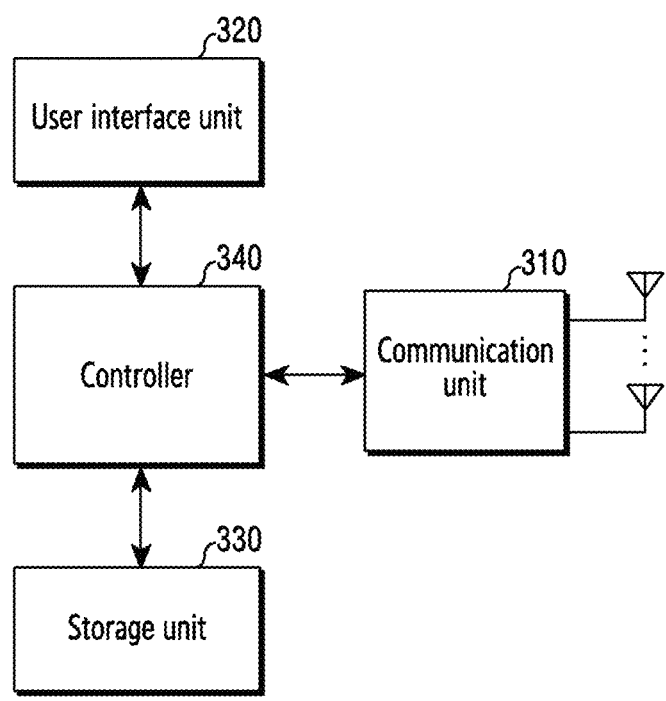
FIG. 3 illustrates the configuration of a controlling terminal in a wireless communication system according to various embodiments.

FIG. 3 illustrates the configuration of a controlling terminal in a wireless communication system according to various embodiments. The configuration illustrated in FIG. 3 may be understood as the configuration of the controlling terminal 113. The terms 'unit', '-or/er', and the like used herein indicate a unit for processing at least one function or operation, which may be implemented as hardware, software, or a combination thereof.

Referring to FIG. 3, the controlling terminal includes a communication unit 310, a user interface unit 320, a storage unit 330, and a controller 340.

The communication unit 310 performs functions for transmitting or receiving a signal through a wireless channel. For example, the communication unit 310 performs a function of conversion between a baseband signal and a bit stream according to the physical-layer specification of a system. For example, in data transmission, the communication unit 310 encodes and modulates a transmitted bit stream to generate complex symbols. Further, in data reception, the communication unit 310 demodulates and decodes a baseband signal to reconstruct a received bit stream. The communication unit 310 upconverts a baseband signal into a radio-frequency (RF) band signal, and may transmit the RF band signal through an antenna. The communication unit 230 downconverts an RF band signal, received through the antenna, into a baseband signal. In one example, the communication unit 310 may include a transmission filter, a reception filter, an amplifier, a mixer, an oscillator, a DAC, an ADC, or the like.

The communication unit 310 may include a plurality of transmission/reception paths. In addition, the communication unit 310 may include at least one antenna array including a plurality of antenna elements. From the aspect of hardware, the communication unit 310 may include a digital circuit and an analog circuit (e.g., an RFIC). Here, the digital circuit and the analog circuit may be configured as a single package. Further, the communication unit 310 may include a plurality of RF chains. The communication unit 310 may perform beamforming.

The communication unit 310 may include different communication modules to process signals in different frequency bands. Furthermore, the communication unit 310 may include a plurality of communication modules to support a plurality of different radio access technologies. For example, the different radio access technologies may include BLE, Wi-Fi, WiGig, a cellular network (e.g. LTE), and the like. The different frequency bands may include an SHF band (e.g., 2.5 GHz or 5 GHz) and a mm-wave band (e.g., 60 GHz).

As described above, the communication unit 310 transmits and receives a signal. Accordingly, part or all of the communication unit 310 may be referred to as a transmitter, a receiver, or a transceiver. In the following description, transmission and reception performed through a wireless channel are construed as including processing performed as described above by the communication unit 310.

The user interface unit 320 outputs information and performs functions for detecting a user's input. The user interface unit 320 may transmit a command or data input from the user to the controller 340. To this end, the user interface unit 320 may include at least one hardware module for output and input. For example, the hardware module may include at least one of a button, a lever, a sensor, a keyboard, a keypad, a speaker, a microphone, a touch screen, a liquid crystal display (LCD), a light-emitting diode (LED) display, a light-emitting polymer display (LPD), an organic light-emitting diode (OLED) display, an active-matrix organic light-emitting diode (AMOLED) display, and a flexible LED (FLED) display. The user interface unit 320 may output a command or data received from the controller 340 through an input and output device (e.g., a speaker or a display). The user interface unit 320 displays a screen and may thus be referred to as a display unit. Further, the user interface unit 320 detects a user's input and may thus be referred to as an input unit. In some cases, the user interface unit 320 may include only a device for input, excluding a device for output.

The storage unit 330 stores data, such as a default program, an application, and setting information, for the operation of the controlling terminal. The storage unit 330 may be configured as volatile memory, nonvolatile memory, or a combination of volatile memory and nonvolatile memory. The storage unit 330 provides the stored data in response to a request from the controller 340.

The controller 340 controls the overall operation of the controlling terminal. For example, the controller 340 transmits and receives a signal through the communication unit 310. Further, the controller 340 may generate a control command message for controlling an aerial terminal according to a user's input and may transmit the control command message to the aerial terminal through the communication unit 310. In addition, the controller 340 records and reads data in the storage unit 330. The controller 340 may perform functions of a protocol stack required by communication standards. To this end, the controller 340 may include at least one process or microprocessor, or may be part of a processor. Part of the communication unit 310 and the controller 340 may be referred to as a CP. According to various embodiments, the controller 340 may control the controlling terminal to perform operations according to various embodiments described below.

Figure 4:
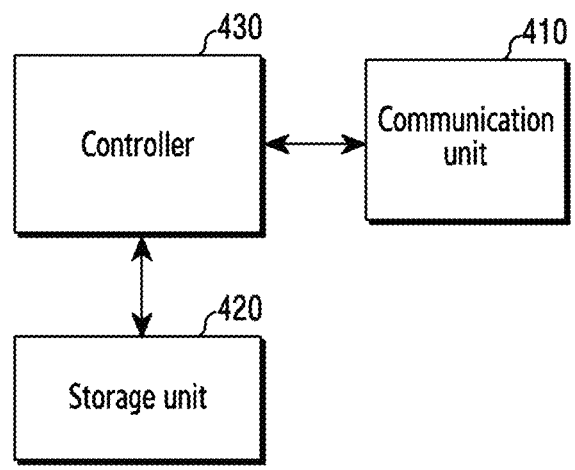
FIG. 4 illustrates the configuration of a core network device in a wireless communication system according to various embodiments.

FIG. 4 illustrates the configuration of a core network device in a wireless communication system according to various embodiments. The configuration illustrated in FIG. 4 may be understood as the configuration of a device having at least one function of the UTM 170, the regulator 190, the SMF, the AMF, the PCF, and the UDM described with reference to FIG. 1. The terms 'unit', '-or/er', and the like used herein indicate a unit for processing at least one function or operation, which may be implemented as hardware, software, or a combination thereof.

Referring to FIG. 4, the core network device includes a communication unit 410, a storage unit 420, and a controller 430.

The communication unit 410 provides an interface for performing communication with other devices in a network. That is, the communication unit 410 converts a bit stream which is transmitted from the core network device to a different device into a physical signal and converts a physical signal which is received from a different device into a bit stream. That is, the communication unit 410 may transmit and receive a signal. Accordingly, the communication unit 410 may be referred to as a modem, a transmitter, a receiver, or a transceiver. Here, the communication unit 410 enables the core network device to communicate with other devices or systems via backhaul (e.g., wired backhaul or wireless backhaul) connection or via the network.

The storage unit 420 stores data, such as a default program, an application, and setting information, for the operation of the core network device. The storage unit 420 may be configured as volatile memory, nonvolatile memory, or a combination of volatile memory and nonvolatile memory. The storage unit 420 provides the stored data in response to a request from the controller 430.

The controller 430 controls the overall operation of the core network device. For example, the controller 430 transmits and receives a signal through the communication unit 410. Further, the controller 430 records and reads data in the storage unit 420. To this end, the controller 430 may include at least one process. According to various embodiments, the controller 430 may control the core network device to perform operations according to various embodiments described below.

Figure 5:
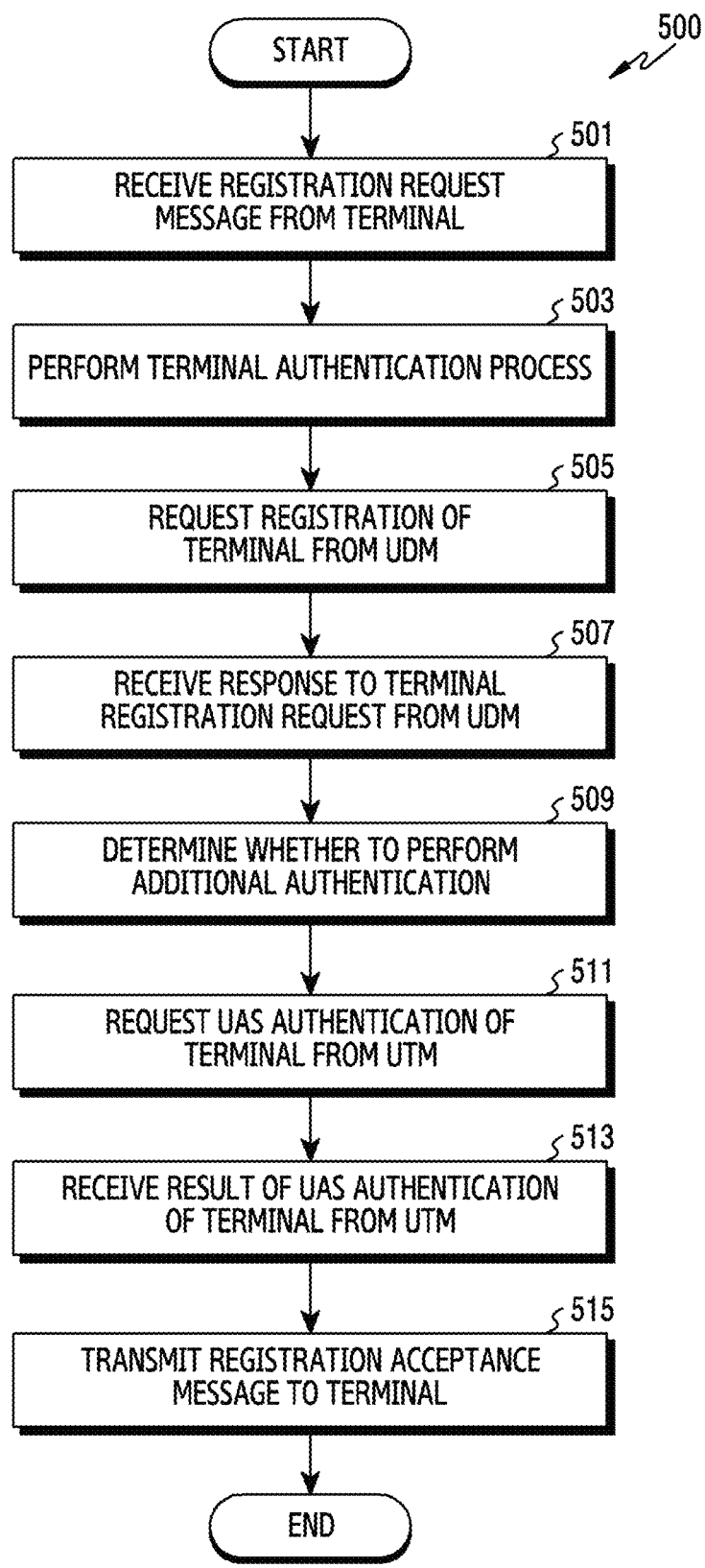
FIG. 5 is a flowchart illustrating the operation of an access management function (AMF) in a wireless communication system according to various embodiments.

FIG. 5 is a flowchart 500 illustrating the operation of an access management function (AMF) in a wireless communication system according to various embodiments. FIG. 5 illustrates an operating method of a device for the AMF.

Referring to FIG. 5, in operation 501, the AMF receives a registration request message associated with a UAS from a UAS terminal. In operation 503, the AMF performs a process of authenticating the UAS terminal. In operation 505, the AMF requests registration of the UAS terminal from a UDM. In operation 507, the AMF receives a response to a registration request of the UAS terminal from the UDM. In operation 509, the AMF determines whether to perform additional authentication. In operation 511, the AMF requests UAS authentication of the UAS terminal from a UTM. In operation 513, the AMF receives a result of UAS authentication of the UAS terminal from the UTM. In operation 515, the AMF transmits a registration acceptance message to the UAS terminal.

Figure 6:
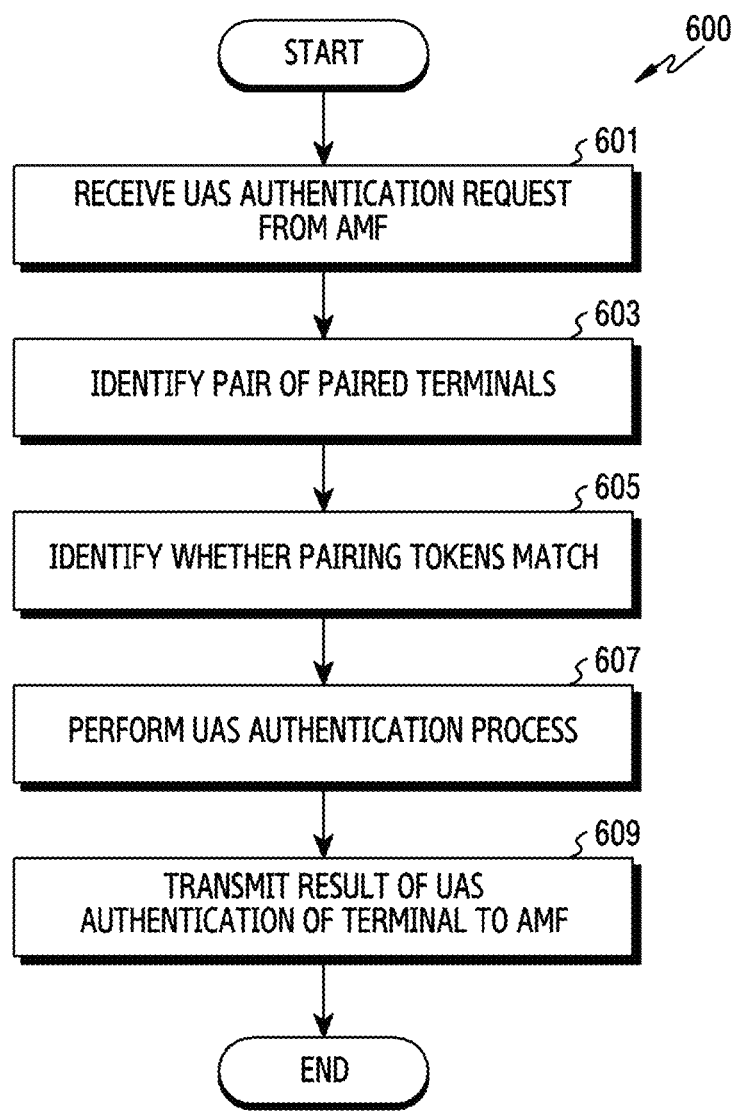
FIG. 6 is a flowchart illustrating the operation of a UAS traffic management (UTM) in a wireless communication system according to various embodiments.

FIG. 6 is a flowchart 600 illustrating the operation of a UAS traffic management (UTM) in a wireless communication system according to various embodiments. FIG. 6 illustrates an operating method of a device for the UTM.

Referring to FIG. 6, in operation 601, the UTM receives a request for UAS authentication associated with a UAS from an access management function (AMF). In operation 603, the UTM identifies a pair of paired UAS terminals. In operation 605, the UTM identifies whether pairing tokens match. In operation 607, the UTM performs a UAS authentication process. In operation 609, the UTM transmits a result of UAS authentication of the UAS terminals to the AMF.

Figure 7:
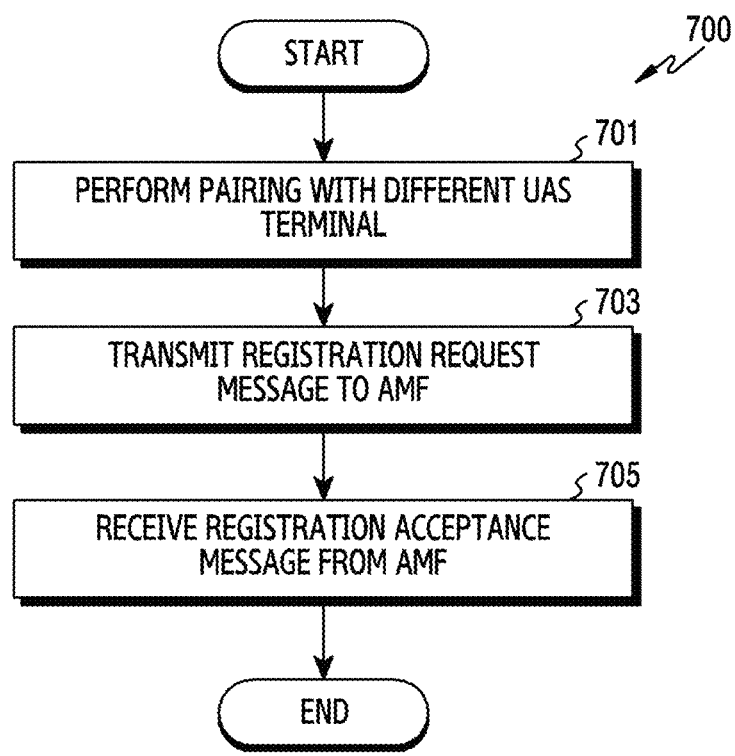
FIG. 7 is a flowchart illustrating the operation of a UAS terminal in a wireless communication system according to various embodiments.

FIG. 7 is a flowchart 700 illustrating the operation of a UAS terminal in a wireless communication system according to various embodiments. FIG. 7 illustrates an operating method of the aerial terminal 115 or the controlling terminal 113.

Referring to FIG. 7, in operation 701, the UAS terminal performs pairing with a different UAS terminal. To this end, the UAS terminal may generate a pairing token and may exchange the pairing token with the different UAS terminal. Accordingly, the UAS terminal may perform mutual authentication and recognition with the different UAS terminal. Here, the pairing token is a unique value shared between the UAS terminals which are mutually paired for a UAS and may be used as information for proving a pairing relationship in subsequent operations. In operation 703, the UAS terminal transmits a registration request message to an AMF. In operation 705, the UAS terminal receives a registration acceptance message from the AMF.

Figure 8:
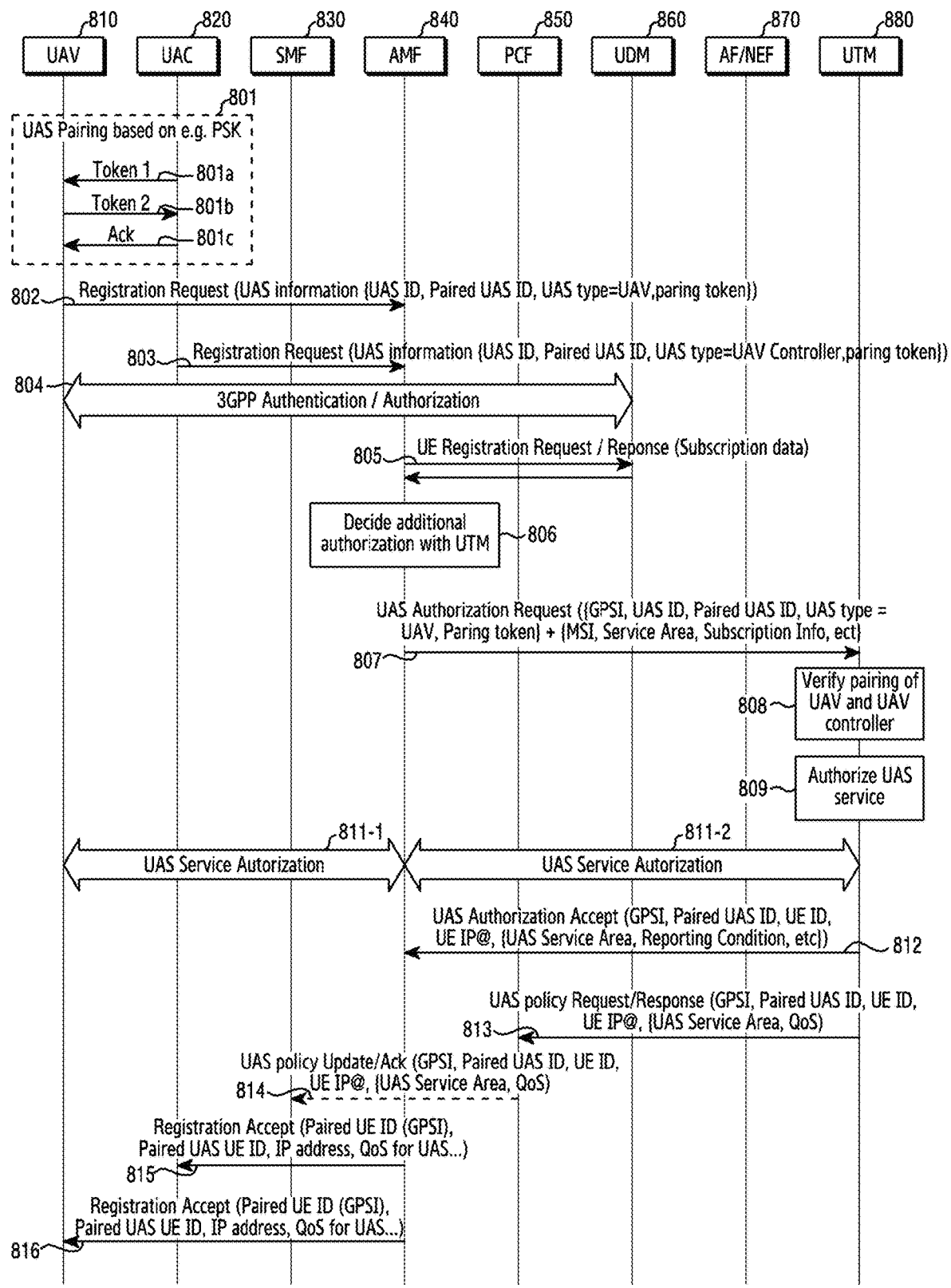
FIG. 8 is a signal exchange diagram showing that a UAS terminal performs authentication for a UAS in a wireless communication system according to various embodiments.

FIG. 8 is a signal exchange diagram showing that a UAS terminal performs authentication for a UAS in a wireless communication system according to various embodiments. Here, the UAS terminal may be understood as either the foregoing aerial terminal or the foregoing controlling terminal. In the following description, the aerial terminal is referred to as a UAV, and the controlling terminal is referred to as a UAC.

FIG. 8 illustrates a procedure in which a UTM 880 receives information required for authentication of a UAS terminal from the terminal and a mobile communication system and performs authentication for a UAS in initial access of the terminal to the mobile communication network, in which specific messages may be changed according to a configuration.

Referring to FIG. 8, in operation 801, the UAS terminal, that is, a UAV 810 and a UAC 820, performs authentication and recognition operations to each other according to a predetermined pairing method in order to mutually transmit and receive flight and control information. As a pairing method to be used, various methods may be applied depending on configurations and products, among which a public key-based authentication method using a short-range transmission technology, such as Wi-Fi or Bluetooth, or a certificate-based authentication method using a certificate issued by a certification authority may generally be applied. For example, in operation 801a, operation 801b, and operation 801c, the UAV 810 and the UAC 820 generate and exchange a pairing token for distinguishing pairing between the UAV 810 and the UAC 820 in a subsequent UAS authentication process during a pairing process.

In operation 802 and operation 803, the UAV 810 and the UAC 820 transmit a registration request message to a mobile communication network in order to perform an initial registration process with the network. Here, the terminal includes UAS information, which is additional information for a UAS, in the registration request message, and the UAS information may include the identifier of a corresponding terminal used for the UAS, the identifier of a paired terminal (including a plurality of identifiers when controlling a plurality of UAVs 810 at the same time), the UAS terminal type of the corresponding terminal (e.g., information for identifying the UAV 810 or the UAC 820), pairing token information, and the like. According to an alternative provided method, when the terminal does not need to use the UAS through an initial access process, it is possible to omit the UAS information and to request authentication for the UAS through a protocol data unit (PDU) session generation request at a required time after completing initial access.

In operation 804, upon receiving the registration request message from each UAS terminal, each AMF 840 performs an authentication process necessary for use of a mobile communication system with each UAS terminal. When an authentication operation is successfully completed, the AMF 840 stores the terminal in a user data management (UDM) 860 and receives subscription information about the terminal from the UDM 860 in operation 805. The AMF 840 identifies that the terminal is a UAS terminal based on a user equipment (UE) type transmitted from the terminal or UE type information included in the subscription information about the terminal received from the UDM 860. In operation 806, the AMF 840 determines that it is needed to perform an additional authentication process for UAS authorization for the UAS terminal with the UTM 880. In operation 807, the AMF 840 transmits an UAS authorization request control message to a UTM 880, thereby requesting authentication of the UAS terminal for the UAS. The UAS authorization request message may include a generic public subscription identifier (GPSI), which is the external network identifier of the terminal, and information included in the UAS information received by the AMF 840 from the terminal, that is, the UAS ID, the paired UAS ID, the UAS type, and the pairing token information, and may further include an international mobile station identity (IMSI), which is the internal network identifier of the terminal, service area information, subscription information, and the like.

In operation 808, the UTM 880 identifies a pair of paired UAS terminals from the UAS ID and the paired UAS ID included in the UAS authorization request message received from each AMF 840 and identifies whether the forwarded pairing tokens match. In operation 809, operation 811-1, and operation 811-2, when the pieces of pairing information match, the UTM 880 performs an authentication process for authorizing the UAS with each terminal. After completing the authentication process for the UAS, the UTM 880 transmits a UAS authorization acceptance message including the authentication result for the UAS to the AMF 840 in operation 812. The UAS authorization acceptance message includes the GPSI and the UAS information received from the AMF 840 as information for identifying the terminal and may additionally include the IP address of the terminal, allowed UAS area information, a reporting condition for a UAS location (status) change, and the like.

In operation 813, the UTM 880 may transmit a UAS policy request message for requesting UAS policy updating according to UAS initiation to a policy control function (PCF) 850 of the mobile communication network. The UAS policy request message may include the GPSI, which is the external identifier of the terminal, the UAS information, a terminal IP address, a UAS area, and quality of service (QoS) information required by the UAS.

In operation 814, the PCF 850 transmits a control message delivering updated policy information to a session management function (SMF) 830 when policy updating is needed based on the information included in the UAS policy request message received from the UTM 880.

In operation 815 and operation 816, the AMF 840 configures UAS-related information from the UAS-related information received from the UTM 880 and transmits the UAS-related information to the terminal through a registration acceptance message. Here, the UAS-related information may include an internal identifier or an external identifier of a mobile communication network of a paired counterpart terminal, a UAS identifier of the paired counterpart terminal, the IP address of the counterpart terminal for the UAS, and QoS information used for the UAS.

Figure 9:
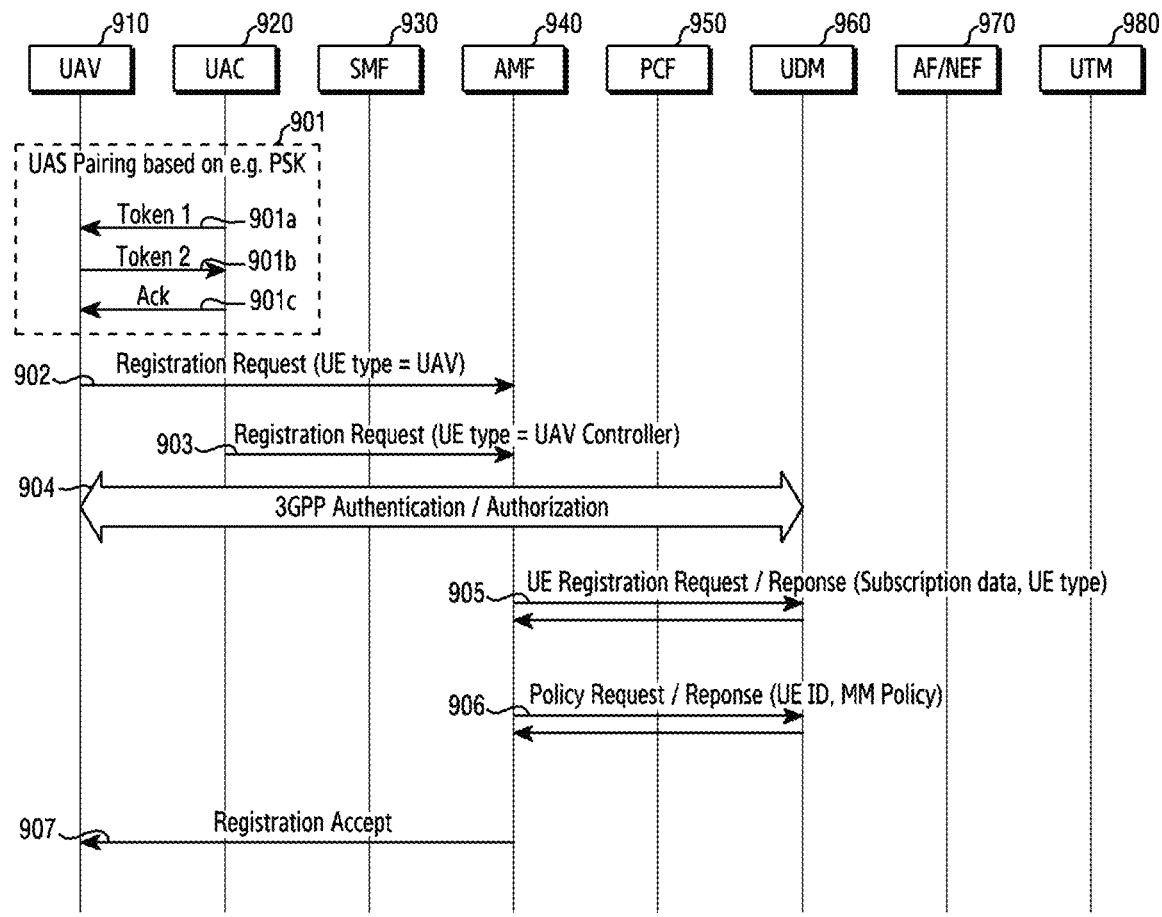
FIG. 9 is a signal exchange diagram showing that a UAS terminal performs initial access in a wireless communication system according to various embodiments.

FIG. 9 is a signal exchange diagram showing that a UAS terminal performs initial access in a wireless communication system according to various embodiments. FIG. 9 illustrates an example of applying the provided method, in which at least one of UAS terminals does not transmit UAS information through a registration request message when pairing between UAS terminals is not completed or the UAS terminal does not require a flight request yet during a registration process for initial access.

Referring to FIG. 9, in operation 901, the UAS terminal, that is, a UAV 910 and a UAC 920, performs authentication and recognition operations to each other according to a predetermined pairing method in order to mutually transmit and receive flight and control information. As a pairing method to be used, various methods may be applied depending on configurations and products, among which a public key-based authentication method using a short-range transmission technology, such as Wi-Fi or Bluetooth, or a certificate-based authentication method using a certificate issued by a certification authority may generally be applied. For example, in operation 901a, operation 901b, and operation 901c, the UAV 910 and the UAC 920 generate and exchange a pairing token for distinguishing pairing between the UAV 910 and the UAC 920 in a subsequent UAS authentication process during a pairing process.

In operation 902 and operation 903, each of the UAV 910 and UAC 920 transmits a registration request message including a control parameter designating a UE type to a UAV or a UAC to an AMF 940 in order to indicate that each of the UAV 910 and UAC 920 is a UAS terminal. Here, the UAV 910 and the UAC 920 may perform a registration process through different AMFs 940 according to a configuration and a network configuration environment. According to a configuration, when UE type information is previously stored as subscriber information in a wireless network, the terminal may omit a UE type parameter from the registration request message. In operation 904, the AMF 940 analyzes the received registration request message and performs a necessary registration process. That is, the AMF 940 controls the UAV 910 and the UAC 920 to perform an authentication process through a UDM 960. When authentication is successfully completed, the AMF 940 registers the UAV 910 and the UAC 920 in the UDM 960 and receives subscription information about a terminal from the UDM 960 in operation 905. In operation 906, the AMF 940 transmits a policy request message to the UDM 960 and receives a policy response message from the UDM 960. The policy request message may include a UE ID, an MM policy, and the like. When the registration request message does not include a UE type parameter, the AMF 940 may identify that the terminal is a UAS terminal through a UE type parameter included in the subscription information received from the UDM 960. When the registration request message does not include a UE type and subscription information about a corresponding terminal received from the UDM 960 does not include a UE type parameter, the AMF 940 cannot determine that the terminal is a UAS terminal. In this case, the terminal may be regarded as a general terminal rather than a UAS terminal. When the registration process is successfully completed, the AMF 940 transmits a registration acceptance message to the terminal in operation 907.

Figure 10:
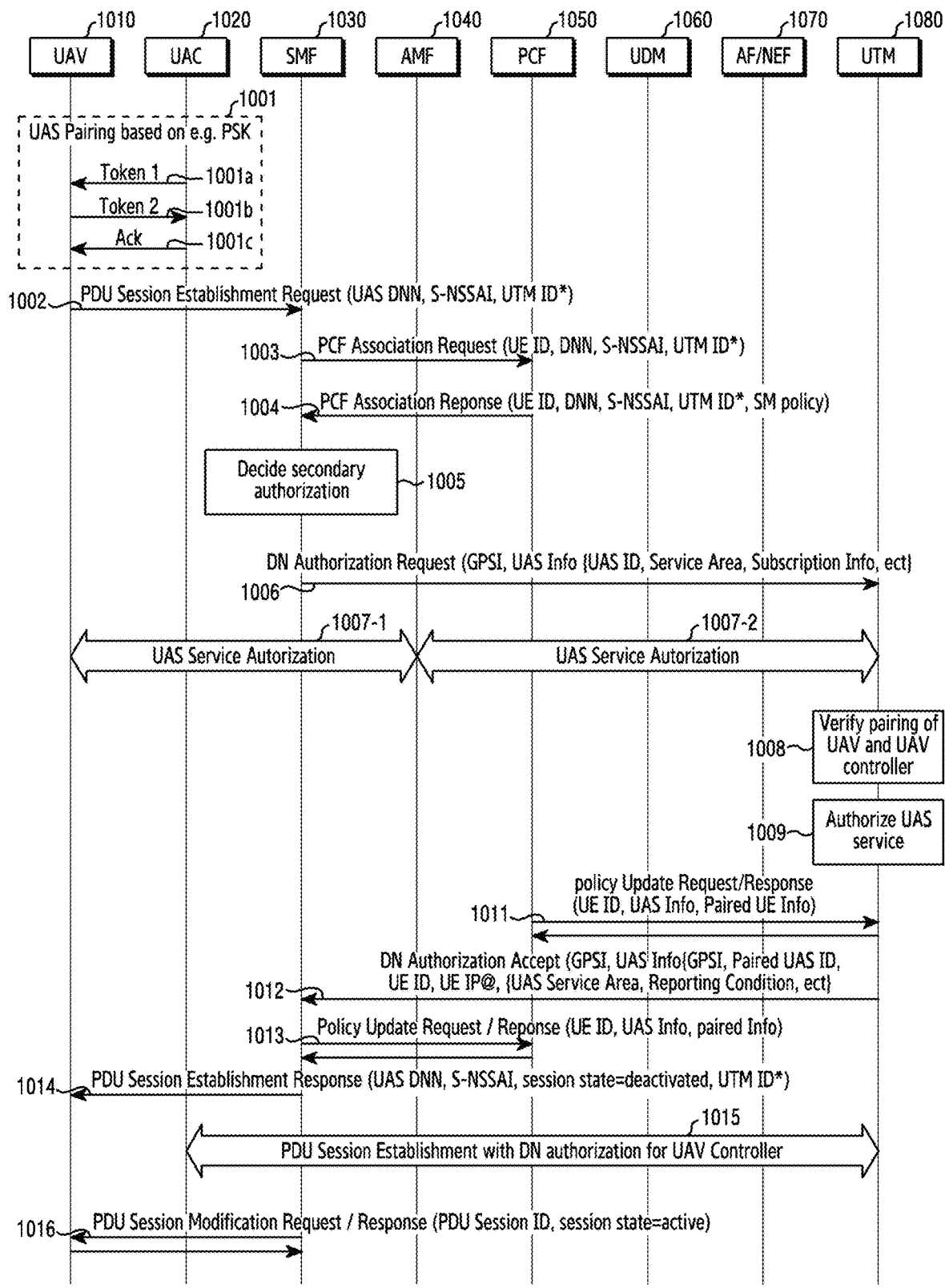
FIG. 10 is a signal exchange diagram showing that a UAS terminal having completed access performs authentication for a UAS in order to use the UAS in a wireless communication system according to various embodiments.

FIG. 10 is a signal exchange diagram showing that a UAS terminal having completed access performs authentication for a UAS in order to use the UAS in a wireless communication system according to various embodiments.

Referring to FIG. 10, in operation 1001, the UAS terminal, that is, a UAV 1010 and a UAC 1020, performs authentication and recognition operations to each other according to a predetermined pairing method in order to mutually transmit and receive flight and control information. As a pairing method to be used, various methods may be applied depending on configurations and products, among which a public key-based authentication method using a short-range transmission technology, such as Wi-Fi or Bluetooth, or a certificate-based authentication method using a certificate issued by a certification authority may generally be applied. For example, in operation 1001*a*, operation 1001*b*, and operation 1001*c*, the UAV 1010 and the UAC 1020 generate and exchange a pairing token for distinguishing pairing between the UAV 1010 and the UAC 1020 in a subsequent UAS authentication process during a pairing process.

In operation 1002, the UAS terminal transmits a PDU session establishment request control message to a mobile communication network in order to generate a PDU session for a UAS. When there is a plurality of UTMs 1080 supporting the UAS, the UAS terminal may transmit a PDU session establishment request message including the ID of a UTM 1080 suitable for the UAS which the UAS terminal wants to use. In operation 1003, after receiving the PDU session establishment request message, an SMF 1030 transmits a PCF association request control message for requesting determination of a policy for a corresponding session to a PCF, and this message may include a terminal identifier received from the UAS terminal, a DNN, request slice information (S-NSSAI), the identifier of the UTM 1080, and the like. In operation 1004, the SMF 1030 receives a PCF association response message from the PCF 1050. In operation 1005, the SMF 1030 determines that secondary authorization is required for a session request from the UAS terminal based on SM policy information included in the PCF association response message.

In operation 1006, the SMF 1030 transmits a DN authorization request message for requesting secondary authorization to the UTM 1080. The DN authorization request message includes a GPSI, which is the external network identifier of the terminal, and UAS information. In operation 1007-1 and operation 1007-2, the UAV 1010 performs a UAS authentication process. When pairing information is not forwarded to the UTM 1080 in a registration process of the UAS terminal, the UAS terminal may transmit the pairing information to the UTM 1080 by including the pairing information in the PDU session establishment request message or by including the pairing information as a parameter of a control message in the UAS authentication process. In operation 1008, during the authentication process, the UTM 1080 identifies information about a paired terminal from the terminal and compares pieces of pairing token information received from the two UAS terminals, thereby identifying the status of pairing between the UAV 1010 and the UAC 1020. In operation 1009, the UTM 1080 determines whether to authorize the pairing and the UAS based on UAS subscription information about the corresponding terminal stored in the UTM 1080. In operation 1011, the UTM 1080 transmits a policy update request message to the PCF 1050 and receives a policy update response message from the PCF 1050. The policy update request message may include a UE ID, UAS information, and information about a paired counterpart terminal. In operation 1011 and operation 1012, the UTM 1080 transmits (1011 and 1012) the result of authorization for the UAS request from the UAS terminal and UAS-related information (e.g., a GPSI, the identifier of a paired counterpart terminal, the IP address of the counterpart terminal, a UAS area, and the like) to the PCF 1050 and the SMF 1030 through separate control messages. In operation 1003, the SMF 1030 requests policy information about a PDU session from the PCF 1050 and receives SM policy information to be applied to the UAS from the PCF 1050. The SMF 1030 can control the PDU session to be limited to be used for the UAS based on the received UAS-related information, and can limit the PDU session to be used only for communication between the UAV 1010 and the UAC and communication between the UAV 1010 (or the UAC) and the UTM 1080 if necessary.

In operation 1014, the SMF 1030 transmits a PDU session establishment response message to the UAS terminal first receiving the PDU session establishment request among the UAV 1010 and the UAC. Here, the newly generated PDU session may be configured to be in a deactivated state until the paired counterpart UAS terminal completes the PDU session according to a configuration and may be controlled by a session state parameter included in the PDU session establishment response message.

In operation 1015, the UAC 1020 performs a PDU session establishment process for using the UAS, including the authentication process with the UTM 1080. In operation 1016, the SMF 1030 repeats the same PDU session establishment process with a second UAS terminal, and when the process is successfully completed, the SMF 1030 transmits a PDU session modification request message including session state information with session state=activate to a first UAS terminal, thereby controlling the first UAS terminal to activate the state of the PDU session for the UAS and to use the PDU session for the UAS.

When the pairing status between the UAS terminals is updated during the UAS, it is possible for the UAS terminal to perform re-authentication with the UTM 1080 using the UAS authentication process illustrated in FIG. 8 or FIG. 9 and FIG. 10 according to UAS provider policies.

The effects obtainable from the disclosure are not limited to the effects mentioned above, and other effects not mentioned will be clearly understood by those skilled in the art from the following description.

Methods according to embodiments illustrated in the claims or specification may be implemented by hardware, software, or a combination of hardware and software.

When the methods are implemented by software, a computer-readable storage medium storing one or more programs (software modules) may be provided. One or more programs stored in the computer-readable storage medium are configured for execution by one or more processors in an electronic device. The one or more programs include instructions that enable the electronic device to execute the methods according to the embodiments illustrated in the claims or specification.

These programs (software modules or software) may be stored in a random-access memory, a nonvolatile memory including a flash memory, a read-only memory (ROM), an electrically erasable programmable ROM (EEPROM), a magnetic disc storage device, a compact disc ROM (CD-ROM), digital versatile discs (DVDs), an optical storage device in a different form, a magnetic cassette, or a memory configured in a combination of some or all thereof. In addition, each constituent memory may be included in plural.

Further, the programs may be stored in an attachable storage device which is accessible through a communication network, such as the Internet, an intranet, a local area network (LAN), a wide area network (WAN), or a storage area network (SAN), or a communication network configured in a combination thereof. This storage device may be connected to a device for performing an embodiment through an external port. In addition, a separate storage device on a communication network may be connected to a device for performing an embodiment.

In the specific embodiments of the disclosure described above, components included in the disclosure are expressed in a singular form or a plural form according to the illustrated specific embodiments. However, singular or plural expressions are appropriately selected for illustrated situations presented for convenience of explanation, and the disclosure is not limited to singular or plural components. A plural expression of a component may include one component or a singular expression of a component may include a plurality of components.

Although specific embodiments have been illustrated in the detailed description of the disclosure, different modifications may be possible without departing from the scope of the disclosure. Therefore, the scope of the disclosure will be defined not by the described embodiments but by the appended claims to be mentioned and equivalents thereto.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a session management function (SMF) entity in a wireless communication system, the method comprising:
  receiving, from an unmanned aerial vehicle (UAV), a message for a protocol data unit (PDU) session establishment request including: an identity of the UAV, and an identity of a UAV controller (UAC) paired to the UAV;
  determining whether an authorization associated with an unmanned aerial service (UAS) is required based on the message for the PDU session establishment request;
  transmitting, to an UAS traffic management (UTM) entity, an authorization request message in case that the authorization is required; and
  receiving, from the UTM entity, an authorization response message,
  wherein the authorization request message includes a generic public subscription identifier (GPSI), the identity of the UAV, and the identity of the UAC.

2. The method of claim 1, wherein the message for the PDU session establishment request further includes a data network name (DNN) and single-network slice selection assistance information (S-NSSAI) associated with a PDU session for the UAS.

3. The method of claim 1, wherein the authorization request message further includes information on a service area associated with the UAS.

4. The method of claim 1, wherein the authorization response message includes a result of the authorization in response to authorizing by the UTM entity based on the authorization request message.

5. The method of claim 1, wherein the UAC is paired with at least one UAV.

6. A method performed by an unmanned aerial service (UAS) traffic management (UTM) entity in a wireless communication system, the method comprising:
  receiving, from a session management function (SMF) entity, an authorization request message in case that authorization is required; and
  transmitting, to the SMF entity, an authorization response message,
  wherein whether the authorization associated with an unmanned aerial service (UAS) is required is determined based on a message for a protocol data unit (PDU) session establishment request from an unmanned aerial vehicle (UAV) to the SMF,
  wherein the authorization request message includes a generic public subscription identifier (GPSI), an identity of an unmanned aerial vehicle (UAV), an identity of a UAV controller (UAC) paired to the UAV, and
  wherein the message for the PDU session establishment request includes the identity of the UAV and the identity of the UAC.

7. The method of claim 6, wherein the message for the PDU session establishment request further includes a data network name (DNN) and single-network slice selection assistance information (S-NSSAI) associated with a PDU session for the UAS.

8. The method of claim 6, wherein the authorization request message further includes information on a service area associated with the UAS.

9. The method of claim 6, further comprising:
performing the authorization whether the UAV is allowed to be paired with the UAC based on the authorization response message,
wherein the authorization response message includes a result of the authorization in response to authorizing whether the UAV is allowed.

10. The method of claim 6, wherein the UAC is paired with at least one UAV.

11. A session management function (SMF) entity in a wireless communication system, the SMF entity comprising:
a transceiver; and
at least one processor coupled to the transceiver,
wherein the at least one processor is configured to:
receive, from an unmanned aerial vehicle (UAV), a message for a protocol data unit (PDU) session establishment request including: an identity of the UAV and an identity of a UAV controller (UAC) paired to the UAV,
determine whether an authorization associated with an unmanned aerial service (UAS) is required based on the message for the PDU session establishment request,
transmit, to an UAS traffic management (UTM) entity, an authorization request message in case that the authorization is required, and
receive, from the UTM entity, an authorization response message, and
wherein the authorization request message includes a generic public subscription identifier (GPSI), the identity of the UAV, and the identity of the UAC.

12. The SMF entity of claim 11, wherein the message for the PDU session establishment request further includes a data network name (DNN) and single-network slice selection assistance information (S-NSSAI) associated with a PDU session for the UAS.

13. The SMF entity of claim 11, wherein the authorization request message further includes information on a service area associated with the UAS.

14. The SMF entity of claim 11, wherein the authorization response message includes a result of the authorization in response to authorizing by the UTM entity based on the authorization request message.

15. The SMF entity of claim 11, wherein the UAC is paired with at least one UAV.

* * * * *